(12) United States Patent
Newton-Dunn et al.

(10) Patent No.: US 9,272,658 B2
(45) Date of Patent: Mar. 1, 2016

(54) ATTENTION AND EVENT MANAGEMENT

(71) Applicant: Google Inc., Mountain View, CA (US)

(72) Inventors: Henry Owen Newton-Dunn, Palo Alto, CA (US); Donald Geoffrey Schuller, San Jose, CA (US); Evan Malahy, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/312,781

(22) Filed: Jun. 24, 2014

(65) Prior Publication Data

US 2015/0367770 A1 Dec. 24, 2015

(51) Int. Cl.
*G06F 17/10* (2006.01)
*H04W 24/00* (2009.01)
*B60Q 1/00* (2006.01)

(52) U.S. Cl.
CPC ......................... *B60Q 1/00* (2013.01)

(58) Field of Classification Search
USPC .................. 701/301; 455/456.1; 340/439
See application file for complete search history.

(56) References Cited

U.S. PATENT DOCUMENTS

| | | | |
|---|---|---|---|
| 7,689,230 B2 * | 3/2010 | Spadafora et al. | 455/456.1 |
| 2004/0088084 A1 * | 5/2004 | Geisler et al. | 701/1 |
| 2008/0133230 A1 * | 6/2008 | Herforth | 704/235 |
| 2012/0100876 A1 * | 4/2012 | Anderson et al. | 455/466 |
| 2012/0176232 A1 * | 7/2012 | Bantz et al. | 340/439 |
| 2012/0202466 A1 * | 8/2012 | Zangvil | 455/412.1 |
| 2012/0209502 A1 * | 8/2012 | Nichols et al. | 701/124 |
| 2012/0253552 A1 * | 10/2012 | Skelton | 701/2 |
| 2012/0268387 A1 * | 10/2012 | Kuo et al. | 345/173 |
| 2013/0151082 A1 * | 6/2013 | Preston | 701/45 |
| 2013/0151111 A1 * | 6/2013 | Skelton | 701/99 |
| 2015/0061875 A1 * | 3/2015 | Yang et al. | 340/576 |

* cited by examiner

*Primary Examiner* — Thomas G Black
*Assistant Examiner* — Tyler Paige
(74) *Attorney, Agent, or Firm* — Morris & Kamlay LLP

(57) ABSTRACT

The present disclosure provides techniques for dynamic driver attention and event notification management based on the current contextual information about a vehicle, driver attention, and a distraction weight of a notification of an event. A method may include receiving a first contextual information about a motorized vehicle. An indication of the occurrence of a first event may be received. It may be determined that the first event has a first event notification weight that satisfies a first notification threshold based on the first contextual information. As a result, a first notification of the first event may be provided to a user of the motorized vehicle.

20 Claims, 7 Drawing Sheets

ATTENTION AND EVENT MANAGEMENT

BACKGROUND

Many mobile devices and automotive multimedia systems provide notification to a driver while operating a vehicle, which can distract the driver. In general, distracted driving is any activity that could divert a person's attention away from the primary task of driving. All distractions endanger driver, passenger, and bystander safety. But, because notifications from a mobile device and/or use of a mobile device requires visual, manual, and cognitive attention from the driver, it is generally considered the most alarming distraction. For example, if a driver is driving a vehicle and approaching a turn, receiving a notification that a text message was received may distract the driver.

BRIEF SUMMARY

According to an embodiment of the disclosed subject matter a method may include receiving a first contextual information about a motorized vehicle. An indication of the occurrence of a first event may be received. It may be determined that the first event has a first event notification weight that satisfies a first notification threshold based on the first contextual information. As a result, a first notification of the first event may be provided to a user of the motorized vehicle.

An implementation of the disclosed subject matter provides a system including a processor configured to receive a first contextual information about a motorized vehicle. An indication of the occurrence of a first event may be received. It may be determined that the first event has a first event notification weight that satisfies a first notification threshold based on the first contextual information. Accordingly, a first notification of the first event may be provided to a user of the motorized vehicle.

In an implementation, a system according to the disclosed subject matter includes means for receiving a first contextual information about a motorized vehicle and means for receiving an indication of the occurrence of a first event. Additionally, the system may include means for determining that the first event has a first event notification weight that satisfies a first notification threshold based on the first contextual information and means for providing a first notification of the first event to a user of the motorized vehicle.

Implementations of the disclosed subject matter provide techniques for dynamic driver attention and event management based on the current contextual information about a vehicle, driver attention, and a notification weight of an event. Based on current contextual information about a motorized vehicle, this information may be used to determine when to provide a notification of an event, e.g., occurring in an application on a driver's mobile device or a motorized vehicle, to the driver. As such, notification of an event may be delayed until the driver is less likely to be unsafely distracted from driving. As a result, this technique may avoid distraction of a driver and thereby avoid potentially dangerous driving mistakes. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

In general, distracted driving is any activity that could divert a person's attention away from the primary task of driving. All distractions endanger driver, passenger, and bystander safety. Many mobile devices and automotive multimedia systems provide notifications to a driver while operating a vehicle, which can distract the driver. But, because notifications from a mobile device and/or use of a mobile device requires visual, manual, and cognitive attention from the driver, it is generally considered among the most alarming distraction. For example, if a driver is driving a vehicle and approaching a turn, receiving a notification, from the driver's mobile device and/or the vehicle's multimedia system, that a text message was received may distract the driver approaching the turn. This type of distraction can be potentially dangerous.

The present disclosure provides a technique for delaying notifications of certain events, e.g., occurring on a driver's mobile device or in a vehicle, based on current contextual information about the motorized vehicle the user is driving and the user's current attention load. For example, embodiments of the disclosed subject matter provides systems and methods for ranking, filtering, and managing notifications received from an application operating on a user's device and/or a vehicle which the user is driving. As an example, an attention management system may receive contextual information about a motorized vehicle that a user is driving. The user's mobile device may be in communication with the motorized vehicle, e.g., via a wired or wireless connection. A text message may be received on the user's mobile device. The contextual information may indicate an attention load required by the driver. For example, it may be determined from the contextual information that the driver is approaching a U-turn. As a result, rather than present a notification of the text message upon receipt of the text message and potentially distracting the driver during the U-turn, the notification may be delayed. In particular, the notification may be delayed until additional contextual information is received indicating that a low attention load is required by the user, for example the vehicle may be parked. Accordingly, the notification may be presented to the user.

Figure 1:
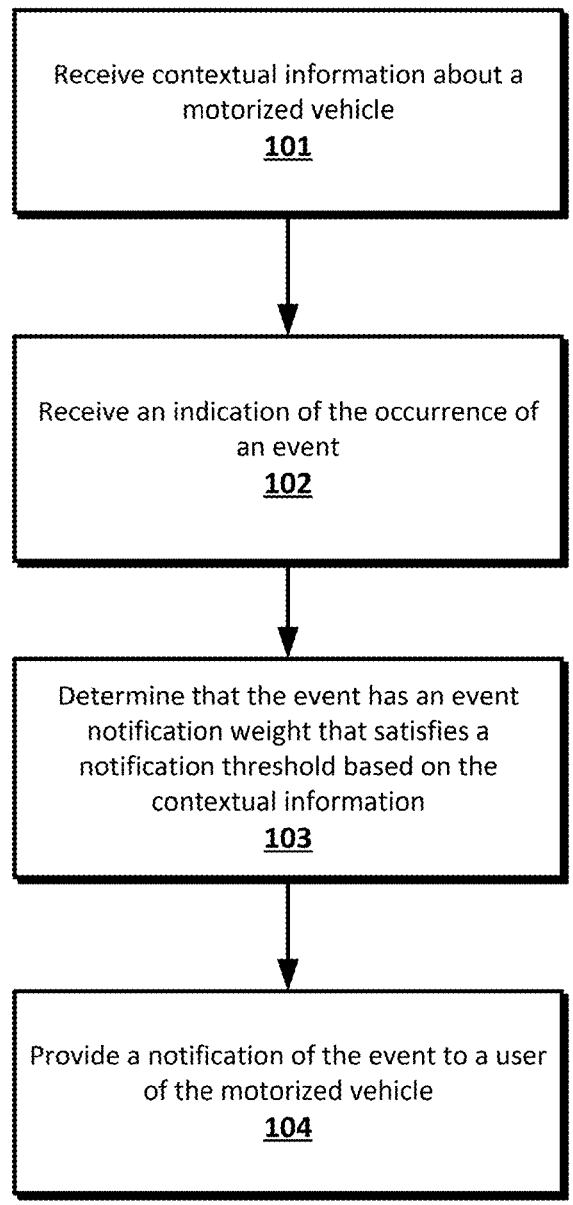
FIG. 1 shows an example process according to an implementation of the disclosed subject matter.

FIG. 1 shows an example process according to an implementation of the disclosed subject matter. As shown, contextual information may be received about a motorized vehicle, at 101. Contextual information may include any information about the current state of a motorized vehicle such as speed, location, the upcoming step in a sequence of navigation instructions, whether the brakes are currently being pressed, and the like. Contextual information may be based on any data received from one or more sources such as a mobile device, a sensor associated with a mobile device, the motorized vehicle, a sensor associated with the motorized vehicle, a GPS, and a navigation system. Examples of a mobile device include a smartphone, a tablet, a laptop, a wearable computer, and the like. A sensor associated with a mobile device may be any sensor on the mobile device that may be used to provide contextual information about a motorized vehicle to which the mobile device is connected or inside which the mobile device is present. A motorized vehicle may be any self-propelled wheeled vehicle such as a car, a motorcycle, a truck, a bus, and the like. A sensor associated with a motorized vehicle may be any sensor on the vehicle that may be used to provide contextual information about the vehicle such as a speedometer, a sensor that may indicate the rotation of a steering wheel, a sensor that may indicate what gear the vehicle is in, a sensor that may indicate if the brakes are being pressed, a sensor that may indicate the status of the engine, etc. In general, a sensor associated with a motorized vehicle may provide contextual information such as speed, rotation of the steering wheel, depression of the brakes, car failure, gas level, etc.

Referring back to FIG. 1, an indication of the occurrence of a first event may be received, at 102. An indication of the occurrence of an event may be received from a mobile device associated with the user, a navigation system, a multimedia system associated with the motorized vehicle, and/or the motorized vehicle. Examples of an event that may occur may include receipt of an email, receipt of a text message, an incoming call, receipt of an alert, receipt of a notification associated with an application, receipt of a push notification. Other examples of events (e.g., events that may be received from the motorized vehicle, a navigation system, and/or a multimedia system associated with the motorized vehicle) may include a gas level notification, a traffic alert, an upcoming step in a set of navigation instructions, car failure notification, playback of a song, and any other event that may occur and provide a notification to a driver.

Following receipt of an indication of the occurrence of an event, at 102, it may be determined that the event has an event notification weight that satisfies a notification threshold based on the contextual information, at 103. As a result, a notification of the event may be provided to a user of the motorized vehicle (e.g., a driver), at 104. A notification threshold based on the contextual information may indicate the current attention load required by the driver based on the context of the motorized vehicle. Although a notification threshold can be in any suitable format, such as a sliding scale, a value, a percentage, and like, specific examples of notification thresholds may be low attention load and high attention load. Low attention load may indicate that, based on the contextual information, a low attention load is required from the driver. High attention load may indicate that, based on the contextual information, a high attention load is required from the driver. For example, if the driver is simply driving the motorized vehicle at a typical speed without an upcoming critical step in a set of navigation steps, the attention load required from the driver may be low and, accordingly, the notification threshold may be low. On the other hand, if the driver is driving the motorized vehicle and approaching a turn (e.g., based on contextual information received from a navigation application and/or a sensor that measures the rotation of the steering wheel), the attention load required from the driver may be high and, accordingly, the notification threshold may be high. In general, a notification threshold based on contextual information about a motorized vehicle may be used to determine whether a notification of an event should be provided at the time the event occurs or delayed until the contextual information indicates that a low attention load is required from the driver. Further, notification thresholds associated with particular contextual information may be based on a system setting, a user setting, a default setting, and the like. For example, a user setting may indicate that if the contextual information indicates that the motorized vehicle is in drive, the notification threshold may be set to high. Similarly, the user setting may indicate that if the contextual information indicates that the motorized vehicle is parked, the notification threshold may be set to low. In this case, when the motorized vehicle is in drive, the user may only be provided with notifications of events that have an event notification weight that satisfies the high notification threshold. Also, when the motorized vehicle is parked, the user may be provided with notifications of any events (e.g., events having an event notification weight that satisfies both the high and low notification threshold) that occur while the vehicle is parked.

An event notification weight may indicate the importance of an event and the related importance of providing the event notification to a driver at the time the event occurs. Although a notification threshold can be in any suitable format, such as a sliding scale, a value, a percentage, and like, specific examples of event notification weights may be categories such as critical, important, and secondary. In this case, an event having a critical event notification weight may be more important and greater than an event having an important event notification weight which may be more important and greater than an event having a secondary event notification weight. Example of events that may have a critical event notification weight are an upcoming critical step in a set of navigation steps, an incoming call, engine failure, etc. Examples of events that may have an important event notification weight are an upcoming step in a set of navigation steps, low gas, etc. Examples of events that may have a secondary event notification weight are playback of a song, receipt of an email, receipt of a text message, receipt of a voicemail, etc.

Figure 2:
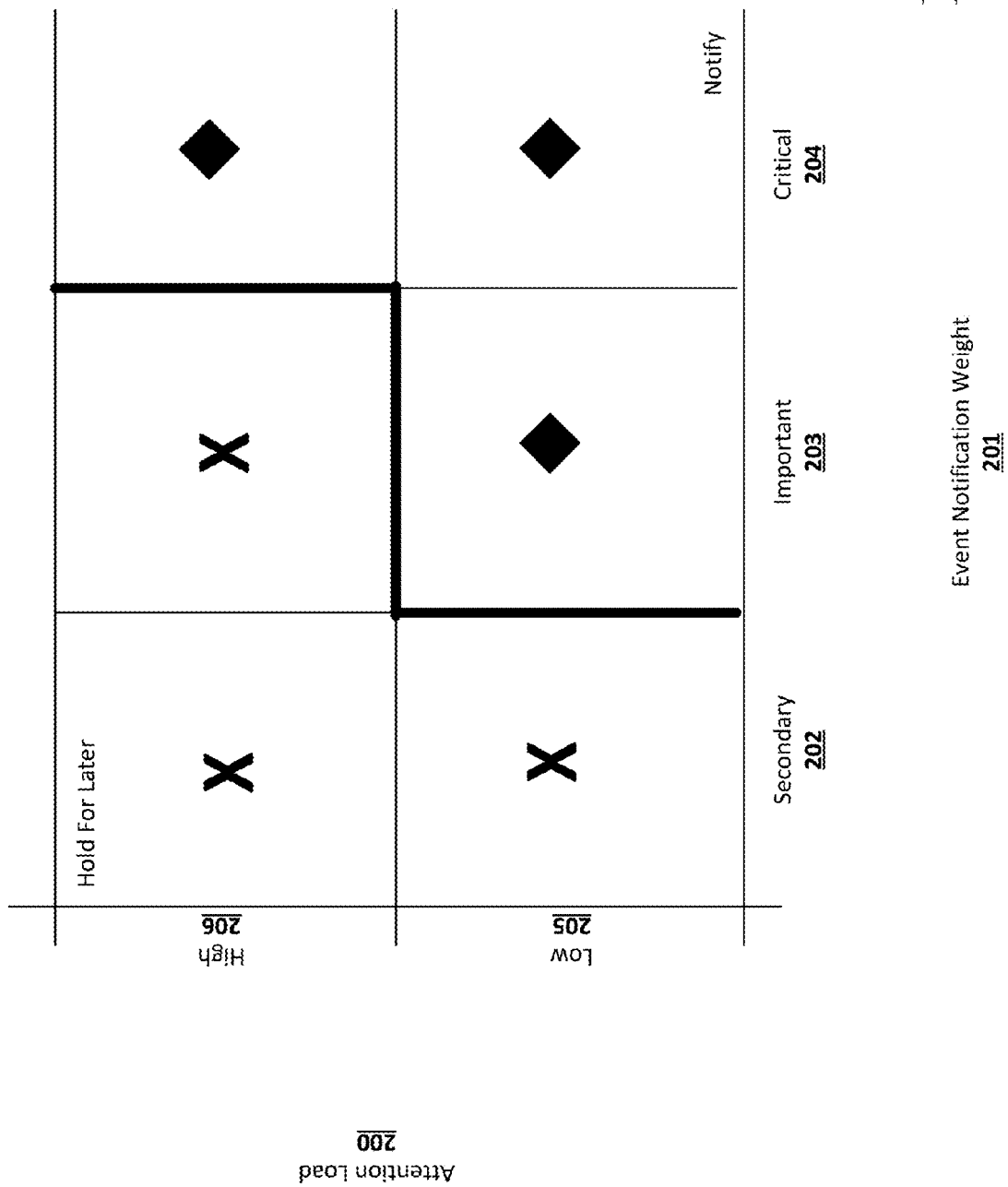
FIG. 2 shows an example attention management technique according to an implementation of the disclosed subject matter.

FIG. 2 shows an example attention management technique according to an implementation of the disclosed subject matter. As shown, the attention load 200 required by a driver (e.g., based on contextual information received about the motorized vehicle which the driver is driving) may be correlated with event notification weight 201. Example event notification weights may be secondary 202, important 203, and critical 204. Example attention load 200 notification thresholds may be a low notification threshold 205 and a high notification threshold 206. As shown, contextual information received about the motorized vehicle may indicate that a low attention load is required from the driver, corresponding to a low notification threshold 205. Similarly, contextual information received about the motorized vehicle may indicate that a high attention load is required from the driver, corresponding to a high notification threshold 206. Accordingly, a determination may be made as to whether a notification of an event that has occurred should be presented to the user based on the event notification weight of the event that occurred and the notification threshold.

For example, if a low attention load is required from the driver, i.e., low notification threshold 205, an event having a secondary notification weight 202 may be held for a later time such that presentation of a notification of the secondary event to the driver is delayed. If a low attention load is required from the driver, i.e., low notification threshold 205, an event having an important notification weight 203 may be provided to the user at the time the event occurs such that a notification of the important event is presented to the driver. If a low attention load is required from the driver, i.e., low notification threshold 205, an event having a critical notification weight 204 may be provided to the user at the time the event occurs such that a notification of the critical event is presented to the driver. As another example, if a high attention load is required from the driver, i.e., high notification threshold 206, an event having a secondary notification weight 202 may be held for a later time such that presentation of a notification of the secondary event to the driver is delayed. Similarly, if a high attention load is required from the driver, i.e., high notification threshold 206, an event having an important notification weight 203 may be held for a later time such that presentation of a notification of the important event to the driver is delayed. Further, if a high attention load is required from the driver, i.e., high notification threshold 206, an event having a critical notification weight 204 may be provided to the user at the time the event occurs such that a notification of the critical event is presented to the driver.

Figure 3B:
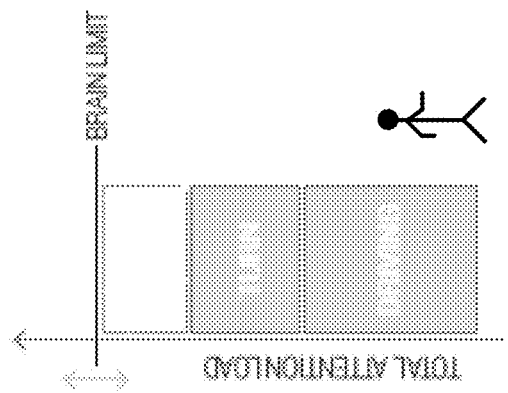
FIG. 3B shows an example attention load according to an implementation of the disclosed subject matter.
Figure 3A:
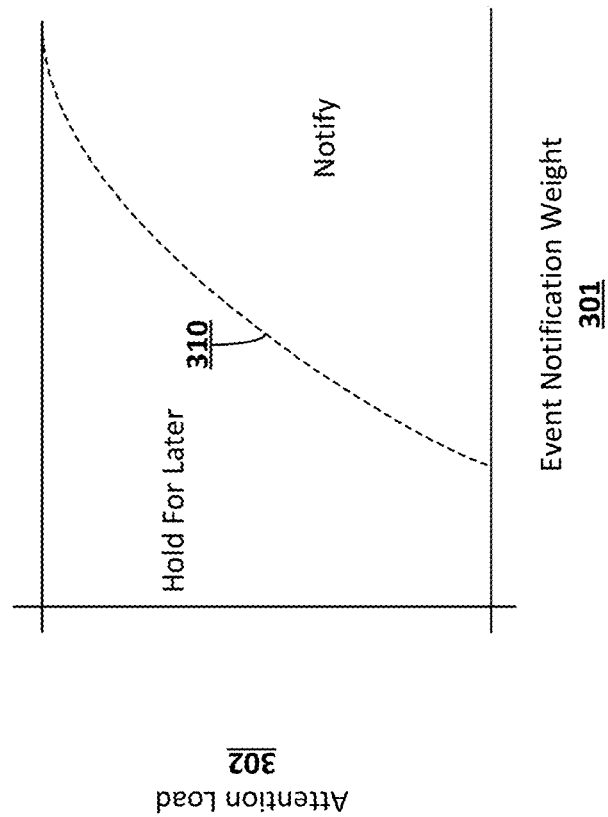
FIG. 3A shows an example correlation of attention load and event notification weight according to an implementation of the disclosed subject matter.

FIG. 3A shows an example correlation of attention load and event notification weight according to an implementation of the disclosed subject matter. As shown, attention load 302 may be correlated with event notification weight 301 to generate a notification threshold 310. As such, this correlation may be used to make a determination as to whether a user, i.e., a driver, should be notified of the occurrence of an event or if the notification of the event that occurred should be held for later presentation to the user. As shown in FIG. 3A, as the event notification weight increases, i.e., associated with an increase in the importance of an event, a determination that a notification of the event should be presented to a user may be made. Similarly, if the required attention load 302 is low and the event notification weight is low, i.e., it does not satisfy the notification threshold 310, a determination to delay notification of the event may be made.

FIG. 3B shows an example attention load according to an implementation of the disclosed subject matter. As shown, certain tasks (e.g., driving, turning, etc.) can require a specific attention load from a user. As the number of tasks that are being performed by a user increases, the attention load required from a user may approach a maximum total attention load which may be the user's brain limit. In particular, driving may place a lower attention load on a user than if the user is driving and turning, which places an additional attention load on the user.

As an example, a user may be driving a motorized vehicle and based on contextual information received about the motorized vehicle, it may be determined that a high attention load is required by the user. For example, a navigation application operating on the user's device or on a vehicle system may indicate that the user is approaching a U-turn as the next step in a set of navigation steps. The high attention load required by the user may correlate to a high notification threshold. An indication may be received that the user's mobile device is receiving an incoming call. An incoming call may have an event notification weight of critical. Accordingly, it may be determined that the incoming call, having a critical event notification weight, satisfies the high notification threshold. As a result, a notification of the incoming call may be provided to the user. As another example, the user may be approaching a U-turn correlating to a high notification threshold and an indication may be received that the user's mobile device received a text message. A text message may have an event notification weigh of secondary. Accordingly, it may be determined that the text message, having a secondary event notification weight, does not satisfy the high notification threshold. As a result, notification of the text message to the user may be delayed until the secondary event notification weight of the text message satisfies the notification threshold, e.g., at a later time when the attention load required by the user is low.

As in the above example, following completion of the U-turn, contextual information received about the motorized vehicle may indicate that a low attention load is required by the user. For example, a sensor on the motorized vehicle may indicate that the motorized vehicle is parked, resulting in a determination of a low notification threshold. At this time, a determination may be made that the secondary event notification weight of the previously received text message satisfies the low notification threshold. As a result, a notification of the text message may be provided to the user.

In some cases, presentation of notifications of events to a user may be prioritized. As an example, a user may be driving a motorized vehicle and based on contextual information received about the motorized vehicle, it may be determined that a high attention load is required by the user. For example, a navigation application operating on the user's device or on a vehicle system may indicate that the user is approaching an important step in a set of navigation steps. The high attention load required by the user may correlate to a high notification threshold. An indication may be received that a calendar reminder for an upcoming appointment has occurred on the user's mobile device. A calendar reminder may have an event notification weight of important. Based on the high notification threshold, it may be determined that the calendar reminder, having an important event notification weight, does not satisfy the high notification threshold. As a result, a notification of the calendar reminder may be delayed. The user may continue driving and at a later time, based on contextual information, it may be determined that a high attention load is required by the user. For example, a sensor on the brakes of the vehicle may indicate that the user is pressing the brakes with high force, e.g., slamming on the brakes. At this time, an indication may be received that the user has received a text message on the user's mobile device. A text message may have an event notification weight of secondary. Based on the high notification threshold, it may be determined that the text message, having a secondary notification weight, does not satisfy the high notification threshold. As a result, notification of the text message to the user may be delayed until the secondary event notification weight of the text message satisfies the notification threshold, e.g., at a later time when the attention load required by the user is low.

In the example above, subsequent contextual information received about the motorized vehicle may indicate that a low attention load is required by the user. For example, a sensor on the motorized vehicle may indicate that the motorized vehicle is parked, resulting in a determination of a low notification threshold. At this time, a determination may be made that both the important event notification of the previously received calendar invite and the secondary event notification weight of the previously received text message satisfy the low notification threshold. However, it may be determined that the important event notification of the calendar invite is greater than the secondary event notification weight of the text message. As a result, a notification of the calendar invite may be provided to the user before providing a notification of the text message to the user.

Figure 4:
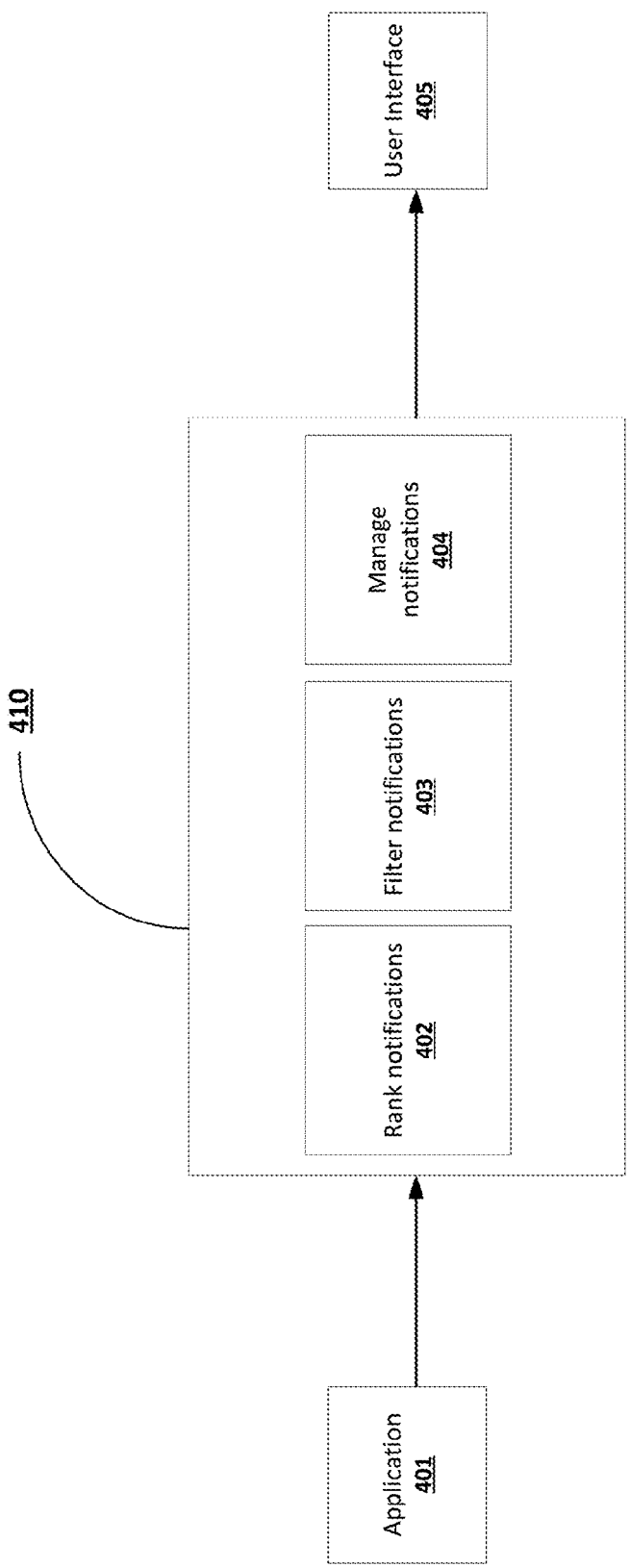
FIG. 4 shows an example information flow according to an implementation of the disclosed subject matter.

As described throughout, the step of determining that an event has an event notification weight that satisfies or does not satisfy a notification threshold based on contextual information may be performed by a system (e.g., a multimedia system) associated with a motorized vehicle, a mobile device associated with the user, or a coordinating device. FIG. 4 shows an example information flow according to an implementation of the disclosed subject matter. As shown, an application 401 may provide an indication of the occurrence of an event to an attention and event management system 410. An application 401 may be any application that may operate on a system associated with a motorized vehicle (e.g., a multimedia system), a mobile device, and/or on any other device or system may provide indications of the occurrence of an event. The attention and event management system 410 may be a component of a motorized vehicle, a mobile device, or a coordinating device, and may exist in a cloud system. The attention and event management system 410 may receive an indication of the occurrence of an event from an application 401. The attention and event management system 410 may also receive contextual information about a motorized vehicle from various sources as discussed above. Based on the contextual information, the attention and event management system 410 may determine an attention load required by the user and the corresponding notification threshold based on the contextual information.

As shown in FIG. 4, the attention and event management 410 may include an event ranking engine 402, an event notification filtering engine 403, and an attention management engine 404. The ranking engine 402, filtering engine 403, and attention management engine 404 may or may not be the same component of the attention and event management system 410. The event ranking engine 402 may receive indications of the occurrence of events from application 401. The event ranking engine 402 may rank events based on the event notification weight associated with each event. For example, events having a critical event notification weight may be ranked higher than events having an important event notification weight which may be ranked higher than events having a secondary event notification weight. The event notification filtering engine 403 may determine which event notification weights satisfy or do not satisfy particular notification thresholds. For example, the event notification filtering engine may determine two notification thresholds such as a low notification threshold and a high notification threshold. Accordingly, the event notification filtering engine may determine whether a particular event notification weight satisfies or does not satisfy a notification threshold. As an example, for a low notification threshold, the event notification weights of critical and important may satisfy the low notification threshold and the secondary notification weight may not satisfy the low notification threshold. Similarly, for a high notification threshold, a critical event notification weight may satisfy the high notification threshold while the important and secondary event notification weights may not satisfy the high notification threshold. The attention management engine 404 may determine, based on contextual information about a motorized vehicle, whether to present a notification of an event at the time the event occurs or delay presentation of the event. When the attention management engine 404 determines that an event notification weight satisfies a notification threshold (i.e., based on the contextual information), the attention and event management system 410 may provide a notification of the event to a user interface 405.

Figure 5:
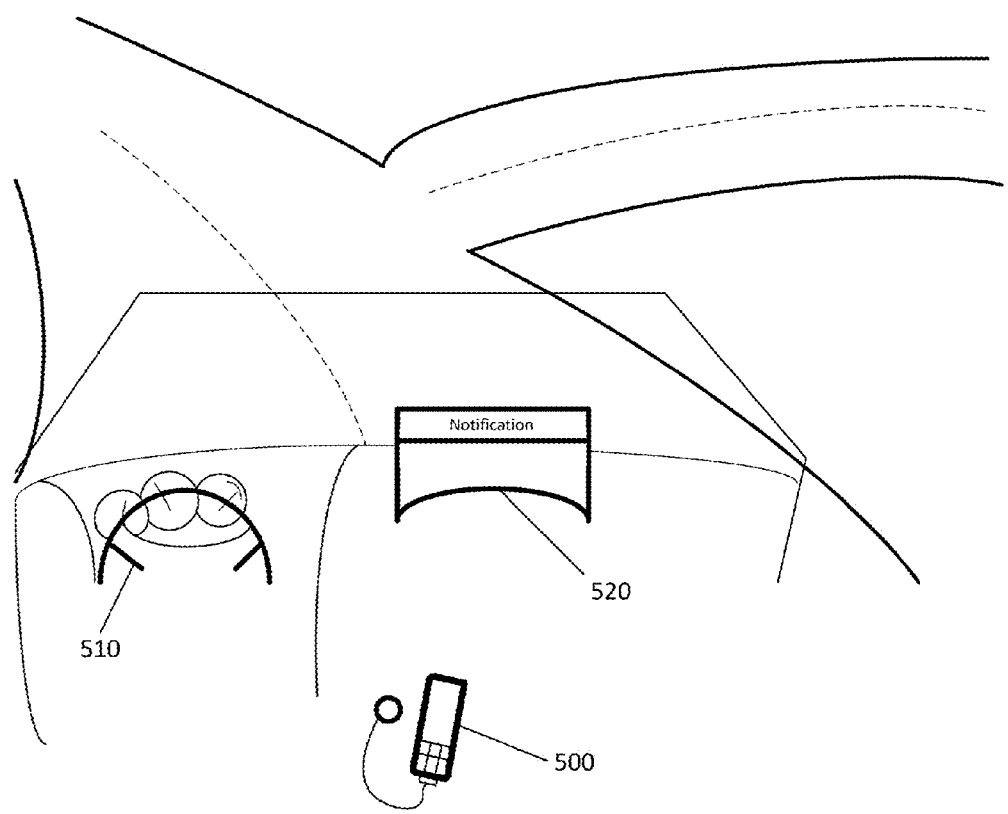
FIG. 5 shows an example arrangement according to an implementation of the disclosed subject matter.

When a notification of an event is provided to a user interface 405, the notification may be displayed to a user in a variety of ways. For example, a notification may be displayed within a user interface of a multimedia system associated with the motorized vehicle and/or a user interface of a mobile device. FIG. 5 shows an example arrangement according to an implementation of the disclosed subject matter. As shown, a mobile device 500 may be in communication with a multimedia system 520 of a motorized vehicle 510. The mobile device 500 communication with the multimedia system 520 via a wired or wireless connection between the mobile device 500 and the multimedia system 520. Upon determining that an event notification weight satisfies a notification threshold, a notification of the event may be provided to the mobile device 510, the motorized vehicle 510, and/or the multimedia system 520. For example, a notification of the event may be displayed in an interface of the multimedia system 520 and/or in an interface of the mobile device 510.

Figure 6:
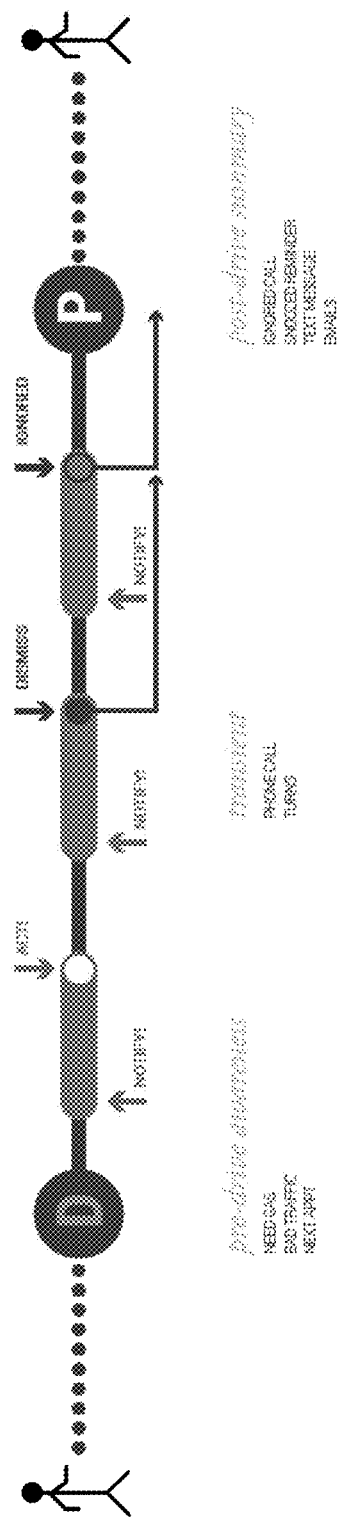
FIG. 6 shows an example timeline according to an implementation of the disclosed subject matter.

In some cases, following completion of a drive, a user may be provided with a post-drive summary including event notifications that may have been delayed, e.g., dismissed or ignored, during the drive. FIG. 6 shows an example timeline according to an implementation of the disclosed subject matter. As shown, each time an indication of the occurrence of an event is received, a determination may be made as to whether to provide a notification to a user or to delay the notification by dismissing or ignoring the notification until a later time. This determination may be made as described throughout based on the contextual information received about the motorized vehicle. For example, a user may begin a drive by changing the gear in a motorized vehicle to drive. At this time, notifications for the gas level, traffic conditions, and an upcoming calendar appointment may be provided to the user. As the drive continues, notifications for events such as an incoming call and the next step in a set of navigation steps may be handled. For example, it may be determined that the event notification weight of the incoming call may not satisfy the notification threshold and the notification of the incoming call may be dismissed. It may be determined that the event notification weight of the next step in the set of navigation steps may satisfy the notification threshold and the notification may be provided to the user. Other notifications of events that occurred during the drive may have been delayed, e.g., ignored. When the contextual information indicates that the motorized vehicle is parked, a post-drive summary may be provided to the user including event notifications that may have been delayed, e.g., dismissed or ignored, during the drive.

In an implementation, the communication between a mobile device, an application, a motorized vehicle, and/or an attention and event management system may be across one or more bridges between the interfaces. For example, the communications between an application and an attention and event management system may be managed or assisted by a coordinating application (which may or may not operate on the same device on which the attention and event management system is operating) or a third device, such as, a coordinating device, a local coordinator, a remote server, etc. In such cases, the coordinating application and/or third device may, for example, receive contextual information about a motorized vehicle and provide the contextual information to the attention and event management system. The coordinating application and/or third device may also receive indications of the occurrence of one or more events from an application (e.g., operating on a device and/or a motorized vehicle)

and provide the indications and provide the indications to the attention and event management system. The coordinating application and/or third device may also determine that an event notification weight satisfies a notification threshold and may provide a notification of the event to a mobile device and/or the motorized vehicle. Similarly, the third device may also receive a determination that the event notification weight satisfies a notification threshold from the attention and event management system, and may provide the notification of the event to the mobile device and/or the motorize vehicle. Furthermore, more than one intermediate device may be implemented to facilitate communication between a mobile device, an application, a motorized vehicle, and/or an attention and event management system.

Figure 7:
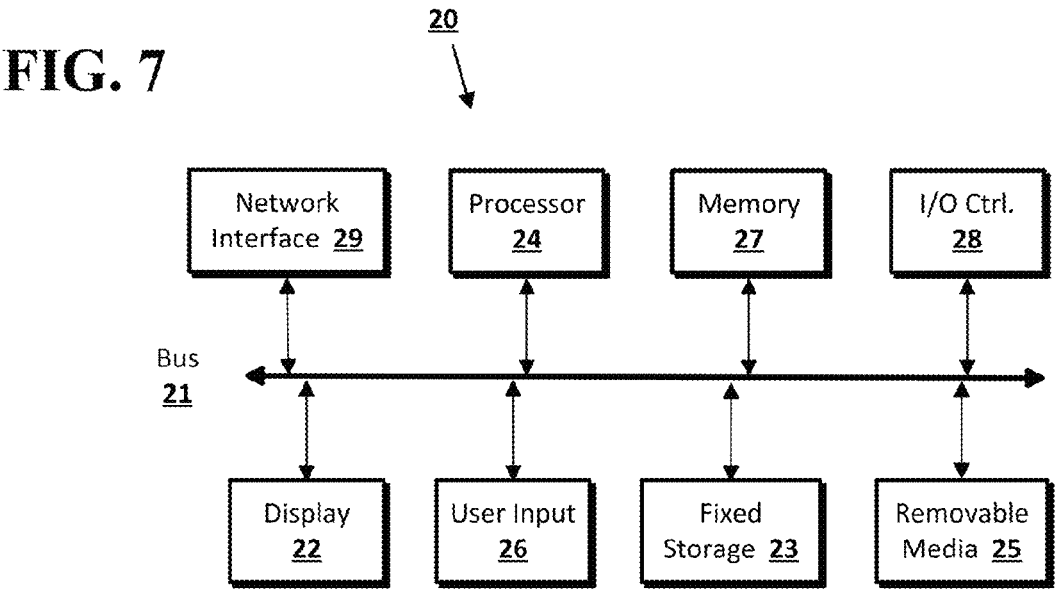
FIG. 7 shows a computer according to an embodiment of the disclosed subject matter.

Embodiments of the presently disclosed subject matter may be implemented in and used with a variety of component and network architectures. FIG. 7 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 8.

Many other devices or components (not shown) may be connected in a similar manner, such as document scanners, digital cameras, auxiliary, supplemental, or backup systems, or the like. Conversely, all of the components shown in FIG. 7 need not be present to practice the present disclosure. The components can be interconnected in different ways from that shown. The operation of a computer such as that shown in FIG. 7 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 8:
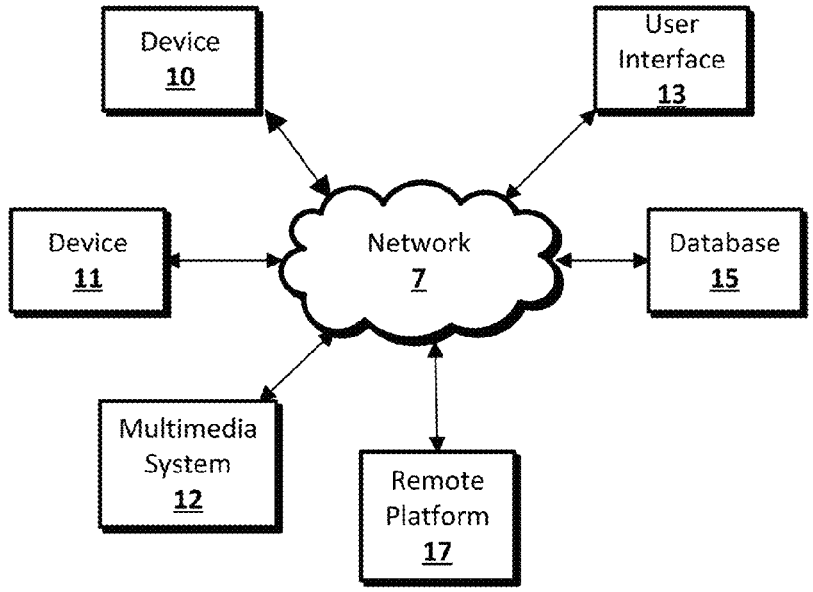
FIG. 8 shows a network configuration according to an embodiment of the disclosed subject matter.

FIG. 8 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, multimedia system 12, user interface systems 13, and remote platform 17. In some cases, clients 10, 11 may communicate with a user interface system 13, which may provide access to one or more other systems such as a database 15, a remote platform 17, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and remote platform 17 may be part of an integral system, or may include multiple computer systems communicating via a private network, the Internet, or any other suitable network. Remote platform 17 may be, for example, part of a distributed system such as a cloud-based computing system, search engine, content delivery system, or the like, which may also include or communicate with a database 15, multimedia system 12, and/or user interface systems 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 12, 13, 15, 17.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as CD-ROMs, DVDs, hard drives, USB (universal serial bus) drives, flash drives, or any other non-transitory machine readable storage medium, such that when the computer program code is loaded into and executed by a computer, the computer becomes an apparatus for practicing embodiments of the disclosed subject matter. Embodiments also may be embodied in the form of computer program code, for example, whether stored in a non-transitory storage medium, loaded into and/or executed by a computer. When the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information, as previously described. The memory or other storage medium may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method of managing notifications in an event management system having one or more processors, a memory and a network interface, comprising:
   receiving a first contextual information about a motorized vehicle;
   receiving an indication of the occurrence of a first event, the first event being selected from a group consisting of: receipt of an email, receipt of a text message, an incoming call, receipt of an alert, receipt of a notification associated with an application, and receipt of a push notification;
   determining that the first event has a first event notification weight that satisfies a first notification threshold based on the first contextual information; and
   providing a first notification of the first event to a user of the motorized vehicle.

2. The method of claim 1, further comprising:
   receiving an indication of the occurrence of a second event;
   determining that the second event has a second event notification weight that does not satisfy the first notification threshold based on the first contextual information; and
   delaying a second notification of the second event to the user of the motorized vehicle until the second event notification weight satisfies a second notification threshold based on a second contextual information.

3. The method of claim 2, further comprising:
   receiving a second contextual information about the motorized vehicle;
   determining that the second event notification weight satisfies the second notification threshold based on the second contextual information; and
   providing the second notification of the second event to the user of the motorized vehicle.

4. The method of claim 3, further comprising:
   receiving an indication of the occurrence of a third event;
   determining that the third event has a third event notification weight that satisfies the second notification threshold based on the second contextual information;
   determining that the third event notification weight is less than the second event notification weight; and
   providing the second notification of the second event before providing a third notification of the third event to the user of the motorized vehicle.

5. The method of claim 1, wherein providing the first notification of the first event comprises displaying the first notification within a user interface of a multimedia system associated with the motorized vehicle.

6. The method of claim 1, wherein providing the first notification of the first event comprises displaying the first notification within a user interface of a mobile device.

7. The method of claim 1, wherein the first contextual information is based on data received from at least one source selected from the group consisting of: a mobile device, a sensor associated with a mobile device, the motorized vehicle, a sensor associated with the motorized vehicle, a GPS, and a navigation system.

8. The method of claim 1, wherein the indication of the occurrence of the first event is received from a mobile device associated with the user.

9. The method of claim 1, wherein the step of determining that the first event has a first event notification weight that satisfies a first notification threshold based on the first contextual information is performed by a multimedia system associated with the motorized vehicle.

10. The method of claim 1, wherein the step of determining that the first event has a first event notification weight that satisfies a first notification threshold based on the first contextual information is performed by a mobile device associated with the user.

11. A system for managing notifications comprising:
    a processor configured to:
    receive a first contextual information about a motorized vehicle;
    receive an indication of the occurrence of a first event, the first event being selected from a group consisting of: receipt of an email, receipt of a text message, an incoming call, receipt of an alert, receipt of a notification associated with an application, and receipt of a push notification;
    determine that the first event has a first event notification weight that satisfies a first notification threshold based on the first contextual information; and
    provide a first notification of the first event to a user of the motorized vehicle.

12. The system of claim 11, wherein the processor is further configured to:
    receive an indication of the occurrence of a second event;
    determine that the second event has a second event notification weight that does not satisfy the first notification threshold based on the first contextual information; and
    delay a second notification of the second event to the user of the motorized vehicle until the second event notification weight satisfies a second notification threshold based on a second contextual information.

13. The system of claim 12, wherein the processor is further configured to:
    receiving a second contextual information about the motorized vehicle;
    determining that the second event notification weight satisfies the second notification threshold based on the second contextual information; and
    providing the second notification of the second event to the user of the motorized vehicle.

14. The system of claim 13, wherein the processor is further configured to:
    receiving an indication of the occurrence of a third event;
    determining that the third event has a third event notification weight satisfies the second notification threshold based on the second contextual information;
    determining that the third event notification weight is less than the second event notification weight; and
    providing the second notification of the second event before providing a third notification of the third event to the user of the motorized vehicle.

15. The system of claim 11, wherein providing the first notification of the first event comprises displaying the first notification within a user interface of a multimedia system associated with the motorized vehicle.

16. The system of claim 11, wherein providing the first notification of the first event comprises displaying the first notification within a user interface of a mobile device.

17. The system of claim 11, wherein the first contextual information is based on data received from at least one source selected from the group consisting of: a mobile device, a sensor associated with a mobile device, the motorized vehicle, a sensor associated with the motorized vehicle, a GPS, and a navigation system.

18. The system of claim 11, wherein the indication of the occurrence of the first event is received from a mobile device associated with the user.

19. The system of claim 11, wherein the step of determining that the first event has a first event notification weight that satisfies a first notification threshold based on the first contextual information is performed by a multimedia system associated with the motorized vehicle.

20. The system of claim 11, wherein the step of determining that the first event has a first event notification weight that satisfies a first notification threshold based on the first contextual information is performed by a mobile device associated with the user.

* * * * *